(12) United States Patent
Moyal et al.

(10) Patent No.: US 12,407,406 B2
(45) Date of Patent: Sep. 2, 2025

(54) TRANSIT ROUTES WITH ORBITAL EDGE COMPUTING RESOURCE AVAILABILITY FOR MOBILE EDGE COMPUTING CONSUMPTION POINTS

(71) Applicant: International Business Machines Corporation, Armonk, NY (US)

(72) Inventors: Shailendra Moyal, Pune (IN); Venkata Vara Prasad Karri, Visakhapatnam (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 681 days.

(21) Appl. No.: 17/651,940

(22) Filed: Feb. 22, 2022

(65) Prior Publication Data
US 2023/0268987 A1   Aug. 24, 2023

(51) Int. Cl.
*H04B 7/185*   (2006.01)
*G06N 20/00*   (2019.01)

(52) U.S. Cl.
CPC ......... *H04B 7/18519* (2013.01); *G06N 20/00* (2019.01); *H04B 7/18513* (2013.01); *H04B 7/18578* (2013.01)

(58) Field of Classification Search
CPC ............ H04B 7/18519; H04B 7/18513; H04B 7/18578; G06N 20/00
USPC ...................................................... 455/428
See application file for complete search history.

(56) References Cited

FOREIGN PATENT DOCUMENTS

| CN | 111623800 A | 9/2020 |
|---|---|---|
| CN | 112653500 A | 4/2021 |
| KR | 10-2016-0147724 A | 12/2016 |

OTHER PUBLICATIONS

"SPACEBELT, Cloud Constellation Corporation, Leading the Cloud Transformation of Space", Downloaded from the Internet on Jul. 14, 2021, 10 pgs., © Copyright—Cloud Constellation Corporation, Los Angeles, California, USA, <http://spacebelt.com/>.
Henry, C., "Getting the Cloud Above the Clouds (and Surviving a Dry Spell)", SPACENEWS, Jan. 18, 2018, 5 pgs., <https://spacenews.com/getting-the-cloud-above-the-clouds-and-surviving-a-dry-spell/>.

(Continued)

*Primary Examiner* — Michael R Neff
(74) *Attorney, Agent, or Firm* — James L. Olsen

(57) ABSTRACT

Disclosed are techniques to determine navigation paths for mobile points of consumption of edge computing resources where the edge computing resources are at least partially hosted on satellite devices. Datasets corresponding to a set of edge computing satellites are received describing their positions, orbital paths, and edge computing resources. Further datasets are received corresponding to mobile points of consumption of edge computing resources. Using both datasets, predictions are determined corresponding to demand for edge computing resources of the edge computing satellites. When a new mobile point of consumption of edge computing resources queues up a transit route to a destination, that transit route and the accompanying requirement for edge computing resources is compared with the determined predictions of resource availability. Where sufficient edge computing resources are unavailable for a transit route, a new route is generated to transit through regions where sufficient edge computing resources are predicted to be available.

18 Claims, 8 Drawing Sheets

(56) References Cited

OTHER PUBLICATIONS

Li, et al., "Integrating Edge Computing into Low Earth Orbit Satellite Networks: Architecture and Prototype", IEEE Access, Mar. 8, 2021, 12 pgs., Digital Object Identifier 10.1109/ACCESS.2021.3064397.

Mohney, D., "OrbitsEdge—Edge Computing in the Sky", Space IT Bridge, The Bridge Between IT and Space, Oct. 4, 2019, 4 pgs., <https://www.spaceitbridge.com/orbitsedge-edge-computing-in-the-sky.htm>.

Nelson, P., "Lasers Will Allow Real-Time Satellite Communications", NETWORKWORLD, Apr. 30, 2015, 6 pgs., <https://www.networkworld.com/article/2917271/lasers-will-allow-real-time-satellite-communications.html>.

Nelson, P., "NASA to Use Data Lasers to Beam Data From Space to Earth", Network World, Aug. 30, 2018, 5 pgs., <https://www.networkworld.com/article/3301294/nasa-to-use-data-lasers-to-beam-data-from-space-to-earth.html>.

Payer, M., "ESA and SES-led Consortium to Develop Satellite-based Cybersecurity", SES, May 3, 2018, 5 pgs., Luxembourg, <https://www.ses.com/press-release/esa-and-ses-led-consortium-develop-satellite-based-cybersecurity>.

Payer, M., "SES Networks Enables Direct Connectivity to IBM Cloud via Global Satellite Network", Business Wire via ITWeb, Oct. 4, 2018, 3 pgs., Luxembourg, <https://www.itweb.co.za/content/KA3WwMdIOKaMrydZ>.

Pfandzelter, et al., "Towards a Computing Platform for the LEO Edge", 4th International Workshop on Edge Systems, Analytics and Networking (EdgeSys '21), Apr. 26, 2021, United Kingdom, ACM, New York, NY, USA, 6 pgs., <https://doi.org/10.1145/3434770.3459736>.

Sverdlik, Y., "Space: the Ultimate Network Edge", DataCenter Knowledge, Oct. 17, 2016, 11 pgs., <https://www.datacenterknowledge.com/archives/2016/10/17/space-the-ultimate-network-edge>.

University of Geneva, "Bursting the Clouds for Better Communication", phys.org, Oct. 18, 2018, 3pgs., University of Geneva (UNIGE), Switzerland, <https://phys.org/news/2018-10-clouds.html>.

Wang, et al., "A Dynamic Resource Scheduling Scheme in Edge Computing Satellite Networks", Mobile Networks and Applications, Jan. 3, 2020, Springer Science+Business Media, LLC, part of Springer Nature 2020, 12 pgs., <https://doi.org/10.1007/s11036-019-01421-5>.

Wang, et al., "Satellite Edge Computing for the Internet of Things in Aerospace", Sensors 2019, 19, 4375, Oct. 10, 2019, 16 pgs., College of Intelligence Science and Technology, The National University of Defense Technology, Changsha, China, doi:10.3390/s19204375.

Unknown, "IoT . . . Above-The-Cloud", Retrieved from: https://web.archive.org/web/20191204034423/https://orbitsedge.com/, Retrieval date: Dec. 4, 2019, 5 pages.

TRANSIT ROUTES WITH ORBITAL EDGE COMPUTING RESOURCE AVAILABILITY FOR MOBILE EDGE COMPUTING CONSUMPTION POINTS

BACKGROUND

The present invention relates generally to the field of edge computing resource management, and more particularly to relative positioning of orbiting edge computing devices and mobile edge computing consumption points.

Edge computing is a distributed computing paradigm that brings computation and data storage resources closer to the sources of data. An expected outcome from deploying resources to an edge computing environment is improvements to response times and saving network bandwidth. Otherwise stated, edge computing is a topology- and location-sensitive form of distributed computing. The term edge computing refers to an architecture instead of a specific technology. Edge application services, or applications deployed in edge computing environments, reduce the volumes of data that must be moved, the consequent traffic, and the distance that data must travel. That leads to lower latency and correspondingly reduces transmission costs.

A low Earth orbit (LEO) is an Earth-centered orbit close to the planet, frequently defined as an orbital period of 128 minutes or less (making at least 11.25 orbits per day) and an eccentricity less than 0.25. Many of the artificial objects in outer space are in LEO, with an altitude never further than approximately one-third of the radius of the Earth from the surface of the Earth. A low Earth orbit requires the least amount of energy for satellite placement and provides high bandwidth and low communication latency. Satellites and space stations in LEO are more easily accessible for crew transfers and servicing. Since less energy is required to place a satellite into a LEO, and a satellite there requires less powerful amplifiers for successful transmission, LEO is used for many communication applications.

In the context of spaceflight, a satellite is an object that has been intentionally placed into orbit, designated as artificial satellites to distinguish them from natural satellites such as Earth's Moon. Satellites are used for many purposes, among several other applications, they can be used to make star maps and maps of planetary surfaces, take pictures of planets they are launched into orbit around. Common types of artificial satellites include military and civilian Earth observation satellites, communications satellites, navigation satellites, weather satellites, and space telescopes. Space stations and human spacecraft in orbit are also types of satellites. Satellites can operate independently by themselves or as part of a larger system, sometimes referred to as a satellite formation or satellite constellation.

SUMMARY

According to an aspect of the present invention, there is a method, computer program product and/or system that performs the following operations (not necessarily in the following order): (i) receiving an edge computing satellite dataset including information indicative of (a) orbital information of a plurality of edge computing satellites devices in orbit around an astronomical object, and (b) edge computing capabilities of the plurality of edge computing satellite devices; (ii) receiving a plurality of edge computing mobile consumption point datasets corresponding to a plurality of edge computing mobile consumption points, including a first edge computing mobile consumption point, where a given edge computing mobile consumption point dataset includes (a) transit information for the given edge computing mobile consumption point, and (b) edge computing requirements of the given edge computing mobile consumption point; (iii) determining, by machine logic, a predicted edge computing resources availability dataset corresponding to predicted availability of edge computing resources of the plurality of edge computing satellite devices based, at least in part, on: (a) the edge computing satellite dataset, and (b) the plurality of edge computing mobile consumption point datasets; and (iv) determining, by machine logic, a transit route from a current location of the first edge computing mobile consumption point to a destination location of the first edge computing mobile consumption point based, at least in part, on (a) the transit information of the first edge computing mobile consumption point, (b) the edge computing requirements of the first edge computing mobile consumption point, and (c) the predicted edge computing resources availability dataset.

DETAILED DESCRIPTION

Figure 1:
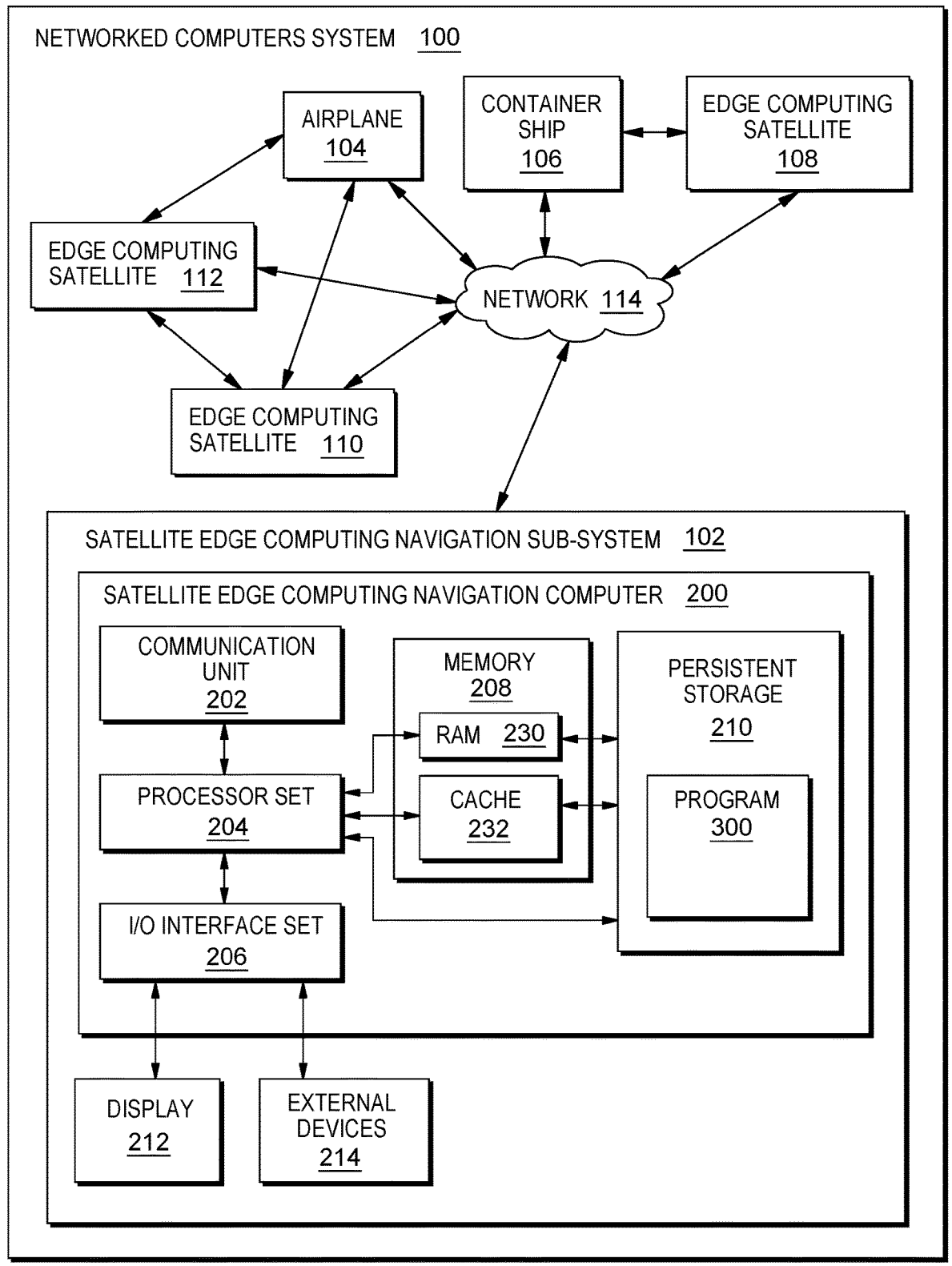
FIG. 1 is a block diagram view of a first embodiment of a system according to the present invention.

Some embodiments of the present invention are directed to techniques to determine navigation paths for mobile points of consumption of edge computing resources where the edge computing resources are at least partially hosted on satellite devices. Datasets corresponding to a set of edge computing satellites are received describing their positions, orbital paths, and edge computing resources. Further datasets are received corresponding to mobile points of consumption of edge computing resources. Using both datasets, predictions are determined corresponding to demand for edge computing resources of the edge computing satellites. When a new mobile point of consumption of edge computing resources queues up a transit route to a destination, that transit route and the accompanying requirement for edge computing resources is compared with the determined predictions of resource availability. Where sufficient edge computing resources are unavailable for a transit route, a new route is generated to transit through regions where sufficient edge computing resources are predicted to be available.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: satellite edge computing navigation subsystem 102 (sometimes herein referred to, more simply, as subsystem 102); airplane 104; container ship 106; edge computing satellites 108, 110 and 112; and communication network 114. Satellite edge computing navigation subsystem 102 includes: satellite edge computing navigation computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

Airplane 104 is an atmospheric aircraft vehicle capable of atmospheric flight having edge-computing assisted autopilot capabilities requiring 100 edge computing processing units per second during transit and 32 gigabytes of edge computing memory during transit.

Container ship 106 is a nautical vessel for transporting large numbers of standard storage containers having an edge-computing assisted container tracking system requiring 75 edge computing processing units per second during transit and 18 gigabytes of edge computing memory during transit.

Edge computing satellites 108, 110 and 112 are artificial satellites, each respectively representative of a series of satellites within a shared orbit stationed in LEO at approximately 250 kilometers above the surface of the Earth and having 150 edge computing processing units and 64 gigabytes of edge computing memory. Edge computing satellites 108, 110 and 112 are each available to provide edge computing capabilities to edge computing consumption points, such as airplane 104 and container ship 106, within different regions of the north Atlantic Ocean such that the coverage area or footprint of each satellite (or series of satellites in a shared orbit) upon the Earth is distinct from each other. Edge computing satellites can handoff assignment of edge computing resources to other edge computing satellites as they orbit out of and into position to provide edge computing resources to an edge computing consumption point by communicating with each other their assignments and their corresponding information and/or data. When one edge computing satellite moves out of position to continue providing their edge computing resource to a customer or subscriber, the edge computing satellite hands off this provisioning to another edge computing satellite (with the appropriate available resources), if available, that is in position to do so, which then takes over and provides their edge computing resources to the customer or subscriber until out of position to do so, continuing the process.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
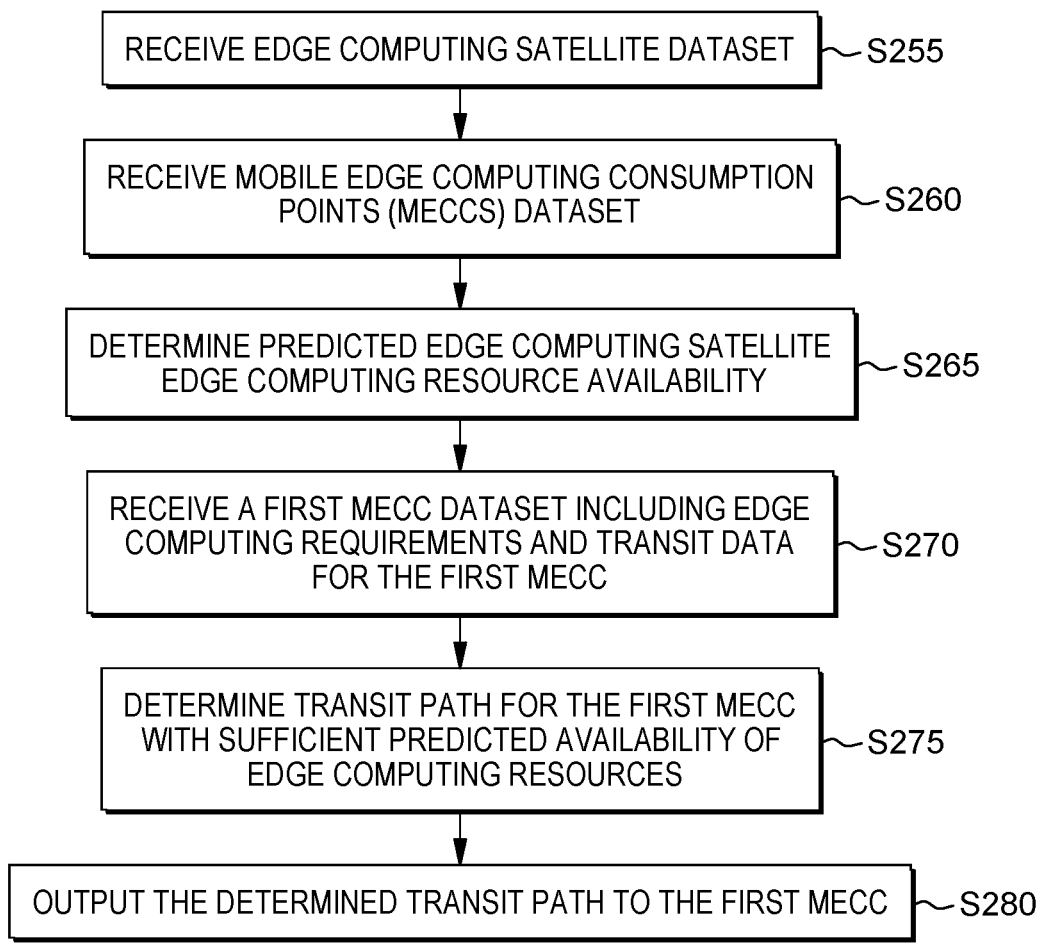
FIG. 2 is a flowchart showing a first embodiment method performed, at least in part, by the first embodiment system.
Figure 3:
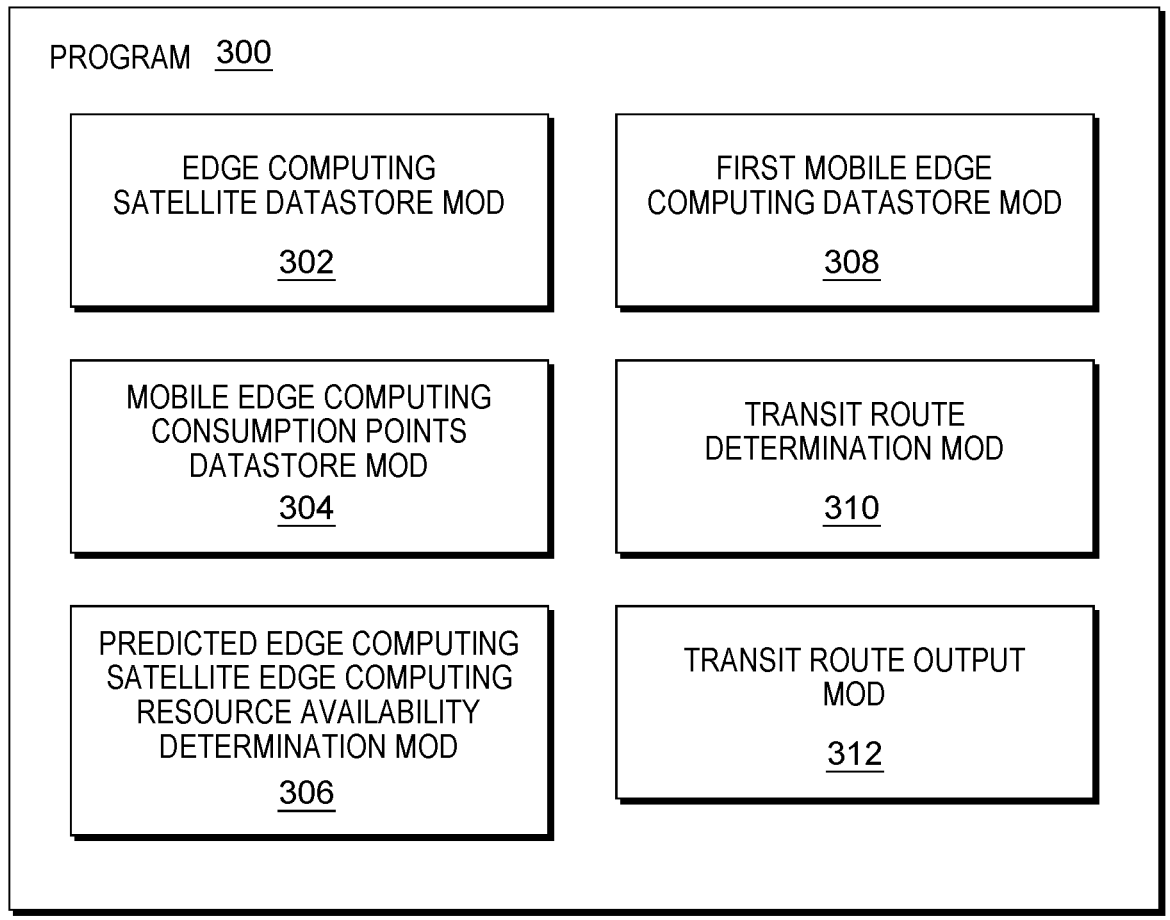
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Figure 4A:
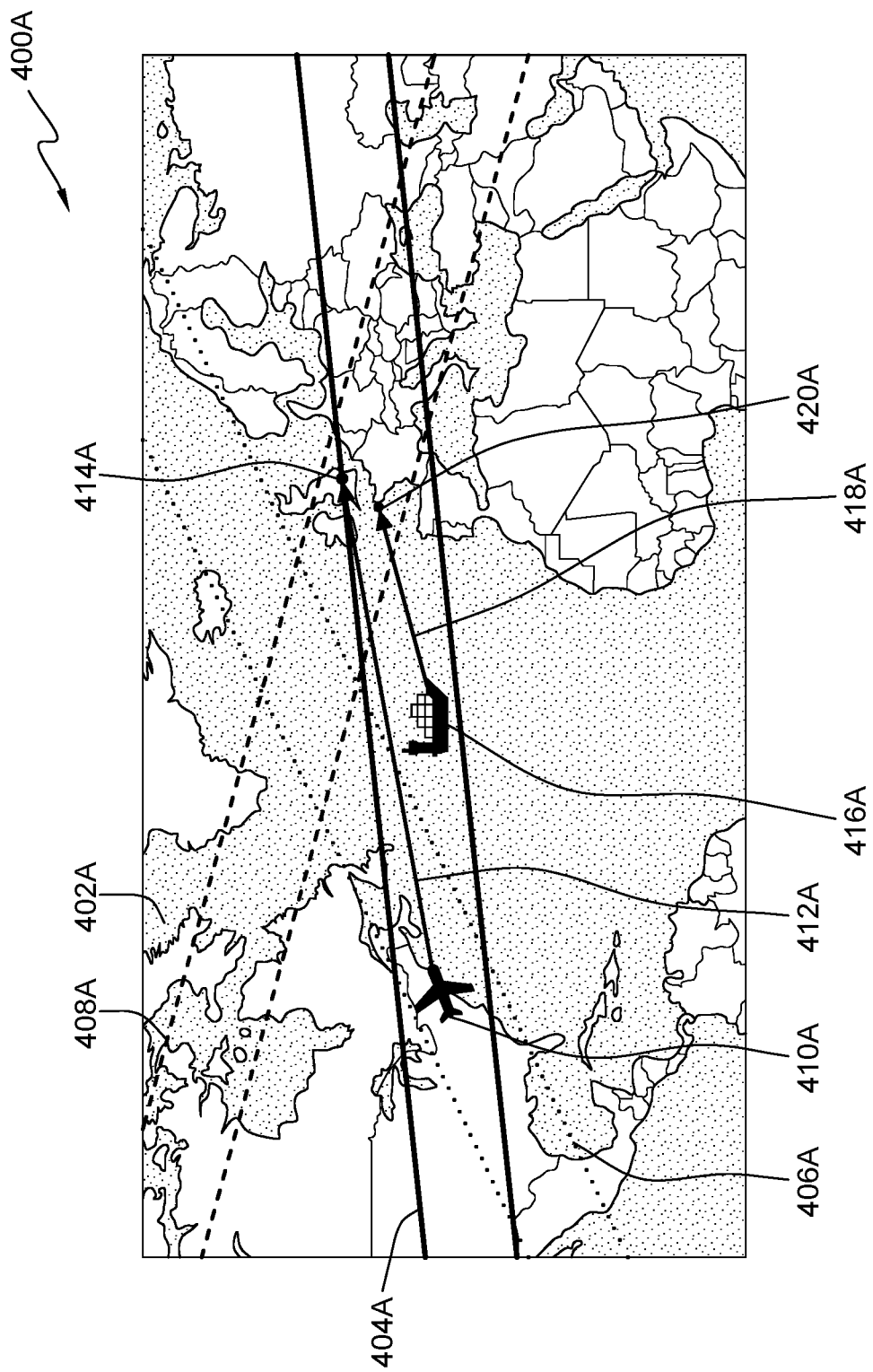
FIG. 4A is a screenshot view generated by the first embodiment system.

Processing begins at operation S255, where edge computing satellite datastore module ("mod") 302 receives an edge computing satellite dataset. In this simplified embodiment, the edge computing satellite dataset comprises three sets of records, each concerning one set of edge computing satellites orbiting in a low Earth orbit (LEO), shown by illustrative examples edge computing satellites 108, 110 and 112 of FIG. 1, with each set of edge computing satellites orbiting in a different LEO having different coverage paths, shown as 404A, 406A, and 408A of screenshot 400 of FIG. 4, respectively, upon map 402A, showing an aggregation of footprints for the individual satellites in a given LEO. For a given coverage path, the set of edge computing satellites includes at least one satellite, but may include enough satellites along the same LEO such that at any given point in time, there is at least one edge computing satellite in position to provide edge computing services to every portion of the coverage path continuously throughout a typical 24 hour period of time. An edge computing satellite footprint corresponds to a cone, extending from a point beginning at the edge computing satellite and extending down onto a circle upon the surface of the Earth, where the coverage path of edge computing satellites in a LEO corresponds to the radius of the cone at a given distance, with smaller radii at higher altitudes and larger radii at lower altitudes.

In some alternative embodiments, there are multiple edge computing satellites available to provide continuous edge computing services throughout a given coverage path, to provide redundancy or additional capacity for services. In this simplified embodiment, a given set of records within the edge computing satellite dataset includes the following information: (i) a coverage path encompassing coordinates where the satellite(s) edge computing services are available for consumption by edge computing consumption points; (ii) available edge computing processing units provided for edge computing services in a given edge computing satellite; and (iii) available edge computing memory space provided for edge computing services in a given edge computing satellite. For example, the sets of records corresponding to edge computing satellite 108 includes the following: (i) the path shown as 404A on FIG. 4A; (ii) 100 edge computing processing units; and (iii) 64 gigabytes of edge computing memory space. For edge computing satellite 110, the corresponding sets of records includes the following: (i) the path shown as 406A on FIG. 4A; (ii) 100 edge computing processing units; and (iii) 64 gigabytes of edge computing memory space. For edge computing satellite 112, the corresponding sets of records includes the following: (i) the path shown as 408A on FIG. 4A; (ii) 100 edge computing processing units; and (iii) 64 gigabytes of edge computing memory space.

Processing proceeds to operation S260, where mobile edge computing consumption points datastore mod 304 receives a mobile edge computing consumption points (MECCs) dataset. In this simplified embodiment, the MECCs dataset corresponds to MECCs that are subscribers to consume satellite-based edge computing resources provided through the edge computing satellites corresponding to the edge computing satellite dataset stored in edge computing satellite datastore mod 302, which includes container ship 106 FIG. 1. An MECC is a point of consumption of edge computing resources with the capability of movement, commonly a vehicle with onboard devices supported by edge computing, such as an airplane, sea vessel or automobile. Consuming edge computing resources to perform operations enables the MECC to offload processing or memory resources that would otherwise be required to be present within the MECC itself or provided through other alternative means to perform those same operations. In some instances, the operations performed onboard the MECC require resources that surpass the potential capacity of the MECC to provide (for example, typical aircraft have limits on weight capacities and electrical power, making an onboard server datacenter unfeasible for weight and electrical power generation reasons).

In this simplified embodiment, the MECCs dataset includes a set of records for container ship 106. For the MECCs dataset set of records corresponding to container ship 106, the following information is included: (i) current location coordinates—42.211111, −34.641620 (shown as 416A); (ii) destination location coordinates—48.382272, −4.473152 (shown as 420A); (iii) container ship transit route (shown as 418A); (iv) satellite-based edge computing processing units required—75 satellite edge computing processing units; and (v) satellite-based edge computing memory space required—18 gigabytes.

Processing proceeds to operation S265, where predicted edge computing satellite edge computing resource availability determination mod 306 determines predicted edge computing satellite edge computing resource availability. In this simplified embodiment, predicted edge computing satellite edge computing resource availability determination mod 306 determines predicted edge computing satellite edge computing resource availability by determining how much of each edge computing resource is required by the MECCs in the MECCs dataset. In this simplified embodiment, container ship 106 requires 75 edge computing processing units and 18 gigabytes of edge computing memory. Next, predicted edge computing satellite edge computing resource availability determination mod 306 determines, using transit information for the MECCs such as current position, destination, and routes for the MECCs, to determine where and when those edge computing resources are required to be available throughout the transit of a given MECC, such as container ship 106 travelling from 416A of FIG. 4A to 420A. Next, predicted edge computing satellite edge computing resource availability determination mod 306 determines which edge computing satellite coverage paths overlap with the routes of the MECCs to determine which edge computing satellites will provide edge computing resources to the MECCs. As shown in screenshot 400A of FIG. 4A, most of the remaining transit route of container ship 106, shown as 418A, is limited to edge computing resources from edge computing satellite 108, denoted by coverage path 404A, with some of the tail-end of the transit route occupying coverage path 408A, corresponding to edge computing satellite 112, in addition to 404A.

As satellites in LEO move very quickly, a given MECC will likely receive edge computing resources from different satellites (at multiple different times), while travelling along the transit route of the MECC, even if that transit route perfectly overlaps with a coverage path of an edge computing satellite, because of their relative velocities. This reality necessitates the handoff of services from one edge computing satellite to the next edge computing satellite following behind it in a given LEO to provide continuous edge computing resources to an MECC at a location at any given time. Thus, the availability of satellite-based edge computing resources is not typically limited by how much edge computing resources are required by all MECCs serviced by edge computing satellites along the same orbital path, but by how much edge computing resources are required by the MECCs within the same footprint of an individual satellite. A bottleneck is introduced when the edge computing resource requirements of MECCs are concentrated within an area of a single edge computing satellite footprint, which can be alleviated by either positioning more edge computing satellites to provide overlapping footprints or rerouting some MECCs to the footprints of other edge computing satellites, splitting the required edge computing resources among additional edge computing satellites.

In some alternative embodiments, predicted edge computing satellite edge computing resource availability determination mod 306 includes machine learning components which are trained using historical usage of edge computing satellite edge computing resources and MECC data to determine patterns of usage and availability of edge computing resources on edge computing satellites, outputting predicted edge computing resource availability for an inputted satellite at an inputted position and an inputted time.

Processing proceeds to operation S270, where first mobile edge computing datastore mod 308 receives a first MECC dataset including edge computing requirements and transit data for the first MECC. In this simplified embodiment, the first MECC dataset corresponds to airplane 104, and includes the following information: (i) current location coordinates—40.634933, −73.777137 (shown as 410A of FIG. 4A); (ii) destination location coordinates—51.464718, −0.483696 (shown as 414A); (iii) airplane transit route (shown as 412A); (iv) satellite-based edge computing processing units required—100 satellite edge computing processing units; and (v) satellite-based edge computing memory space required—32 gigabytes.

Processing proceeds to operation S275, where transit route determination mod 310 determines a transit route for the first MECC with sufficient predicted availability of edge computing resources. In this simplified embodiment, transit route determination mod 310 determines a transit route for the first MECC with sufficient predicted availability of edge computing resources by first comparing the route of the first MECC to the coverage paths of the edge computing satellites in edge computing satellite datastore mod 302 to determine which edge computing satellites will be in positions to provide edge computing resources to airplane 104, which is determined to be edge computing satellite 108 along coverage path 404A. Next, transit route determination mod 310 compares the edge computing resources required by airplane 104 to the predicted edge computing satellite edge computing resource availability to determine if there are sufficient edge computing resources sufficient to meet the edge computing resource requirement of airplane 104 along route 412A. Transit route determination mod 310 determines that along route 412A, there is insufficient edge computing resources available to be consumed by airplane 104 because 75 of the 100 available edge computing processing units of edge computing satellite 108 are predicted for consumption by container ship 106.

Figure 4B:
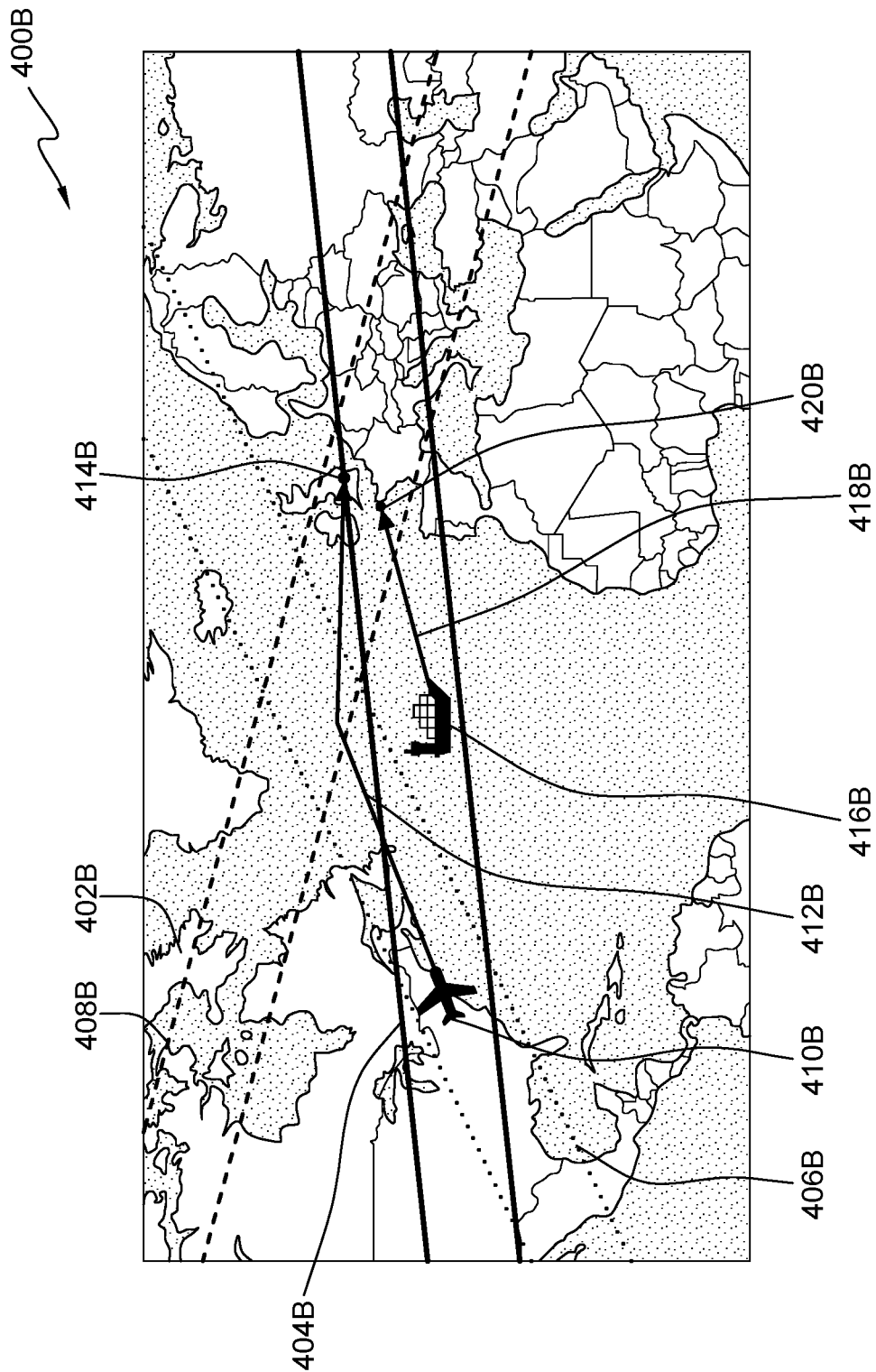
FIG. 4B is a screenshot view generated by the first embodiment system.

Upon determining that there are insufficient edge computing resources along the route for airplane 104, route 412A, transit route determination mod 310 determines a new, alternative route for airplane 104 by comparing the required edge computing resources of airplane 104 to the predicted edge computing satellite edge computing resource availability to determine which edge computing satellites between the current position of airplane 104 and the destination of airplane 104 have sufficient predicted edge computing resources, identifying edge computing satellites 110 and 112 with sufficient predicted edge computing resources, each having 100 edge computing processing units and 64 gigabytes of edge computing memory available. A new transit route, now shown as 412B on map 402B of screenshot 400B of FIG. 4B, is generated by transit route determination mod 310. The new transit route now instructs airplane 104 to transit through coverage path 406B and 408B, the coverage paths of edge computing satellites 110 and 112, respectively, guiding airplane 104, shown at current position 410B, to destination 414B. Still shown in FIG. 4B is container ship 106, shown at current position 416B, with container ship transit path 418B, navigating within coverage path 404B corresponding to edge computing satellite 104 towards destination 420B.

In some alternative embodiments, additional data points are considered when determining a new transit route for airplane 104, or any other MECC in place of airplane 104. For example, some additional data points contributing to determining the new transit route may include, but are not limited to: (i) fuel consumption of the MECC; (ii) maximum available distance that the MECC can travel before requiring refueling; (iii) weather conditions along a transit route; and (iv) air traffic restrictions along a transit route. In yet further alternative embodiments, instead of, or in addition to, determining a new transit route for an MECC, such as airplane 104, at least some edge computing satellites (such as edge computing satellite 110) are instructed to alter their orbital positions to provide additional edge computing resources where needed, based on where additional edge computing resources are required and where there is a surplus of edge computing resources during the predicted requirement for additional edge computing resources.

Processing proceeds to operation S280, where transit route output mod 312 outputs the determined transit route to the first MECC. In this simplified embodiment, screenshot 400B of FIG. 4B is outputted to the first MECC, airplane 104. Airplane 104, in turn, displays screenshot 400B upon a display device. In some alternative embodiments, the determined transit route determined by transit route determination mod 310 is outputted in the form of navigational directions consistent with the type of vehicle the MECC is (for example, a flight plan for an aircraft, street directions for automobiles, and passage plans for aquatic vessels).

III. Further Comments and/or Embodiments

Figure 5:
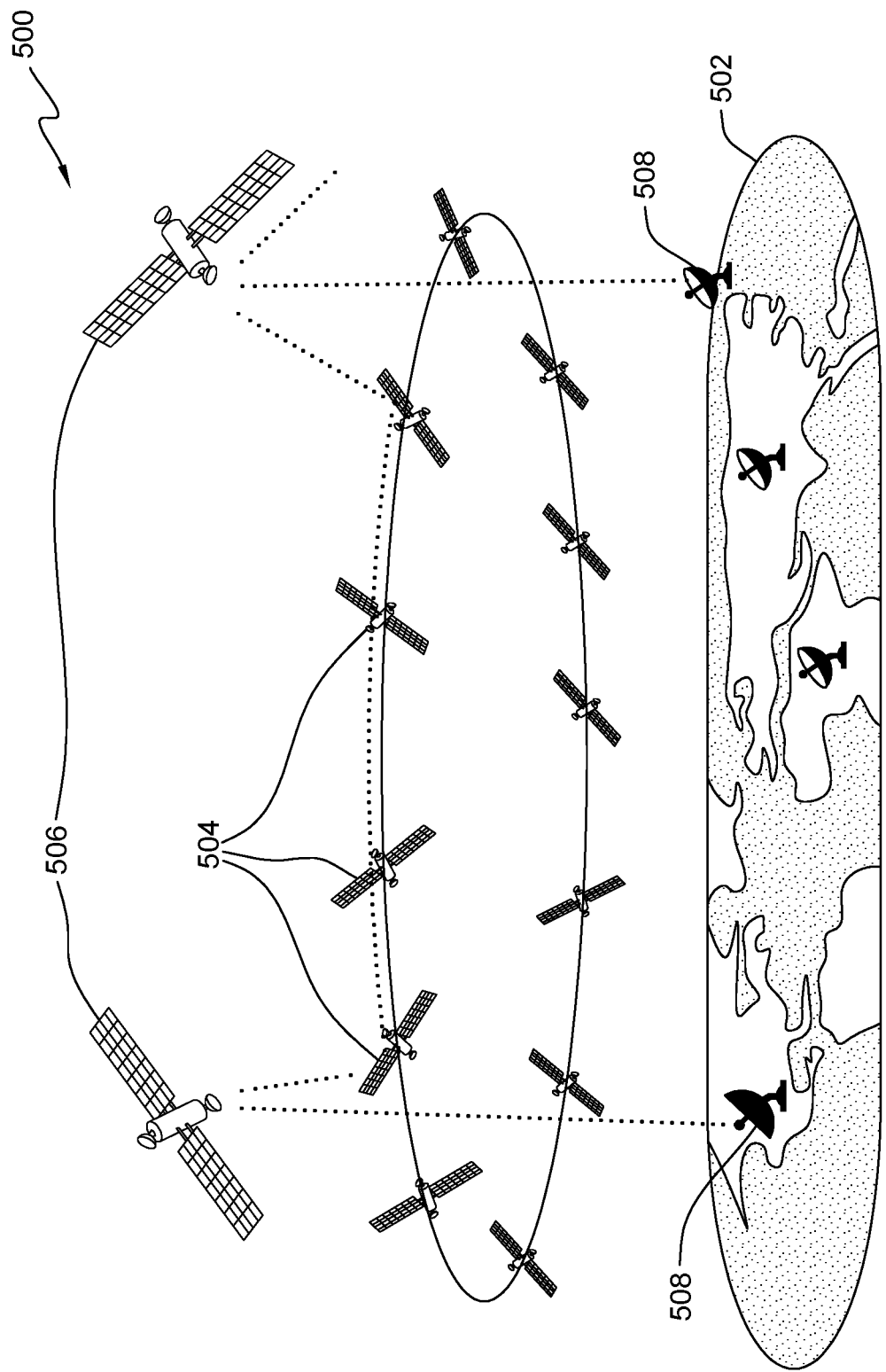
FIG. 5 is a screenshot view showing low-earth and geo-stationary orbit satellites communicating with terrestrial networking points.

Some embodiments of the present invention recognize the following facts, potential problems and/or potential areas for improvement with respect to the current state of the art: (i) deployment of low orbit earth (LEO) satellite-based secure storage will protect critical data from unauthorized access while supporting global communications at reduced latency of today's multi-hop networks; (ii) cloud hosted data center in global satellite network are on the horizon; (iii) direct connectivity to commercial cloud providers via a global satellite network; (iv) the European Space Agency (ESA) and a private consortium are developing a system that will allow the generation of encryption keys from space, as well as their secure transmission to users on Earth via laser; (v) however, this new technology, currently in the testing phase, faces a major problem with weather clouds; (vi) due to their density, clouds stop the laser beams and scramble the transfer of information; (vii) screenshot 500 of FIG. 5 shows how LEO (Low Earth Orbit) satellites 504 and geostationary satellites 506 are communicating with each other for data communications above Earth 502, where geostationary satellites 506 communicate with surface based communication points 508; (viii) laser communication are being explored for space based data centers; (ix) some prominent government space agencies intend to shift their space-to-ground data communications from traditional radio to laser; (x) the move may help internet throughput via over-the-air laser optical become a reality; (xi) lasers will allow real-time satellite communications; (xii) LEO satellite edge computing—LEO satellites are being used for edge computing; (xiii) it can communicate with the other LEO satellites and ground communication systems with laser beams; and (xiv) airplanes, ships, and emergency vehicles can utilize space based edge computing.

Some embodiments of the present invention recognize the following facts, potential problems and/or potential areas for improvement with respect to the current state of the art: (i) in the case of space based edge computing, it can dynamically load software in orbit, flexibly share on-board resources, and provide services coordinated with the cloud; (ii) the corresponding hardware structure and software architecture is shown in block diagram 600 of FIG. 6, discussed further below; (iii) through the modeling analysis and simulation experiments of the application scenarios, the results show that the space based edge computing system takes less time and consumes less energy than the traditional satellite constellation; (iv) the quality of service is mainly related to the number of satellites, satellite performance, and task offloading strategy; (v) in the case of LEO satellites, the positions are not fixed, so the relative position of the LEO satellite and edge computing consumption point (e.g. ship, airplane, emergency vehicle, etc.) can be changed; (vi) at the same, the LEO satellites may already be engaged by other consumption points to provide required edge computing services; and (vii) in this scenario, if the airplane or ship needs a sufficient amount of edge computing then the required number of satellites are to be made available.

Figure 6:
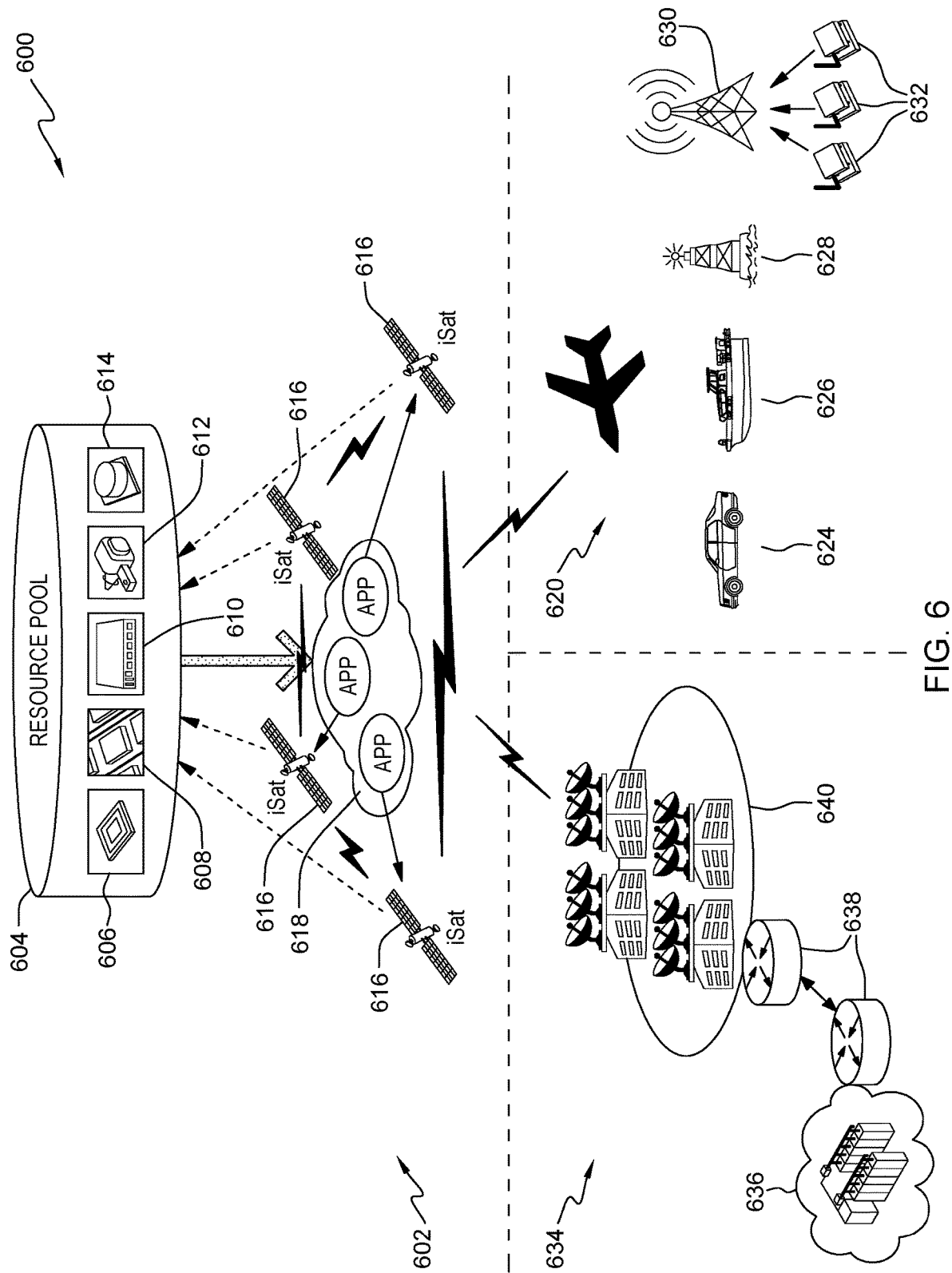
FIG. 6 is a block diagram showing a LEO satellite edge computing environment according to a second embodiment system.

Block diagram 600 FIG. 6 shows a LEO satellite edge computing system according to an embodiment of the present invention, which includes: satellite edge computing system 602; terrestrial cloud computing platform 634; and end user consumption points 620. Satellite edge computing system 602 includes: resource pool 604; satellites 616; and apps 618. Resource pool 604 is a pool of edge computing resources available to satellite edge computing system 602, distributed among satellites 616 for executing apps 618, which includes: computing resource 606; storage resource 608; network resource 610; sensor resource 612; and actuator resource 614. Terrestrial cloud computing platform 634 includes: cloud computing platform 636; terrestrial network 638; and terrestrial stations 640. End user consumption points 620 includes: airplanes 622; vehicles 624; ships 626; buoys 628; and base station 630, with sensors 632. Satellites 616 communicate with end user consumption points 620.

Some embodiments of the present invention may include one, or more, of the following operations, features, characteristics and/or advantages: (i) a technique based on an amount of edge computing needed by one or more edge computing consumption points (like airplanes, ships etc.) and relative geographic location of the edge computing consumption point with respect to the Leo satellites; (ii) the proposed technique will recommend an appropriate route for the edge computing consumption points (like airplanes, ships, etc.) to follow to their destinations so that required quality of LEO satellite edge computing can be achieved whereas quality is considered with multiple attributes; (iii) based on the required level of edge computing quality (e.g. processing data within defined time range) the proposed technique for managing a space based edge computing ecosystem (e.g. LEO Satellites) will predict the availability of the required number of satellites so that the one or more edge computing consumption points (like airplanes, ships, etc.) can receive the required edge computing supports; (iv) based on the predicted demand of the edge competing need at the edge computing consumption points with required level of edge computing quality, the proposed technique will ensure the required computing resources are available so that edge computing demands can be provided; and (v) the proposed technique will recommend an appropriate mobility path or route of the edge computing consumption points to ensure a required quality level of edge computing from space based edge computing network based on historical learning about: (a) edge computing demands, (b) required level of edge computing qualities, (c) availability of the space edge computing resources, and (d) relative movement path of the LEO satellites etc.

Some embodiments of the present invention may include one, or more, of the following operations, features, characteristics and/or advantages: (i) based on relative positions and orbits of LEO satellites, and historical support on edge computing with required quality, the proposed space edge computing ecosystem will identify which orbital position needs additional satellite(s) to the placed so that the required level of quality of edge computing can be provided; (ii) the proposed space edge computing ecosystem will identify the health of different satellites, performance of the satellite, and accordingly ensure the required number of satellites are engaged to perform edge computing with the required quality; (iii) based on the movement path of the edge computing consumption points, the proposed technique will reposition the LEO satellites so that the required level of edge computing support can be provided; (iv) smart contract rule can be used for ensuring if LEO satellite edge computing service providers can provide required level of edge computing supports to different edge computing consumption points; (v) an AI model can be created using the recommendation generated with the success information (mobility path and satellite edge computing service provided in recommendation path) with attribute dependency to improve on the recommendation in future; (vi) the learning method which can be used here will be re-enforcement learning; (vii) the ML model will be helpful to improve on recommendation as well providing the information to LEO service provider to improve on satellite edge computing from manufacturing perspective; and (viii) ML model will be helpful to determine firmware to improve the processing and empower the satellites.

Figure 7:
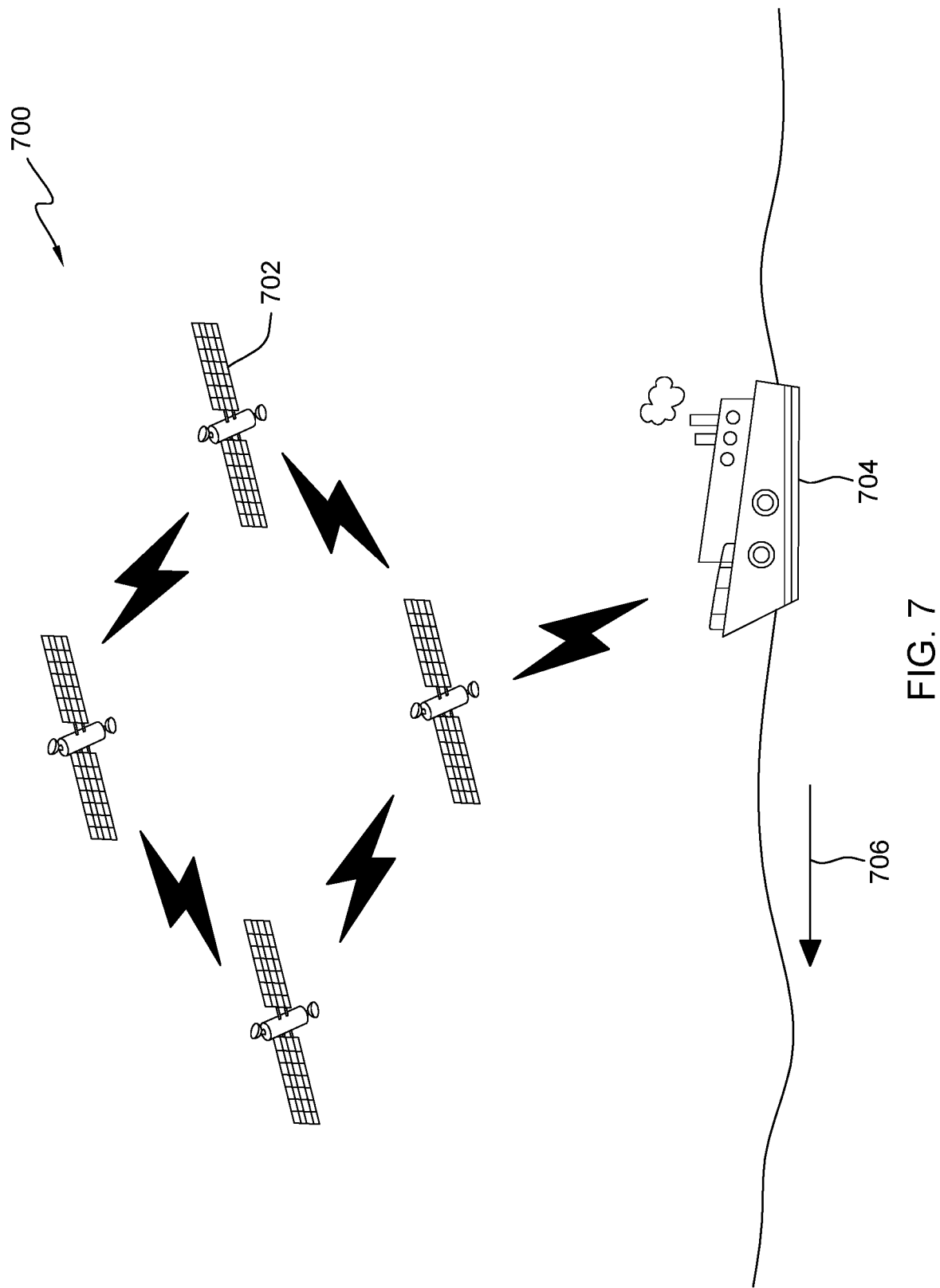
FIG. 7 is block diagram showing a space based edge computing ecosystem according to the second embodiment system.

Block diagram 700 of FIG. 7 shows a space based edge computing ecosystem according to an embodiment of the present invention, including: LEO satellites 702; ship 704; and direction of travel 706. The illustrated space based edge computing ecosystem can ensure a required level of edge computing quality through appropriate route recommendation and/or satellite repositioning, so that continuous edge computing support can be provided with the required quality.

Some embodiments of the present invention may include one, or more, of the following operations, features, characteristics and/or advantages: (i) each and every LEO satellite is identified uniquely; (ii) the position of each and every satellite is identified on real-time basis; (iii) the position of the LEO satellite will change from time to time, but the LEO satellite can be changed from one altitude to another altitude, and so the orbit of the LEO satellite can change; (iv) based on the position of the satellites on the orbit, the predicted movement path of each satellite is identified in different positions; (v) each and every LEO satellite has edge computing resources; (vi) the computing resources can be storage and processing memory; (vii) the LEO satellites are communicating with each other with laser beam based communications and also with the edge computing consumption points; (viii) different edge computing consumption points (such as airplanes, ships, etc.) are identified uniquely; (ix) based on historical learning the edge computing demand is identified; (x) the edge computing needs can also be changed from time to time, and change based on contextual situations; (xi) the contextual situations can be problems with any edge computing consumption points, etc.; (xii) each and every edge computing consumption point will have start and destination locations; (xiii) while the edge computing consumption points are moving, it will require the LEO satellite edge computing ecosystem; (xiv) based on the predicted movement path of the edge computing system consumption points, the proposed technique will identify if sufficient edge computing resources are available; and (xv) the proposed technique will predict the movement path of the LEO satellites and will identify the position of the LEO satellites along with the movement path of the edge computing consumption point.

Some embodiments of the present invention may include one, or more, of the following operations, features, characteristics and/or advantages: (i) the proposed technique will identify how much volume of data will be considered during edge computing and the number of edge computing consumption points; (ii) based on the predicted volume of data requiring space based edge computing during the journey of a consumption point, the proposed technique will predict how many LEO satellites are required and the required positions of the LEO satellites; (iii) the proposed technique will identify the required number of LEO satellite to be involved during processing; (iv) once the required number of LEO satellites are identified, the proposed technique will initiate laser beam based communication among the participating LEO satellites; (v) the proposed technique will identify the predicted movement path of the LEO satellites and the movement path of the edge computing consumption points; (vi) based on the movement path of the edge computing consumption points and the LEO satellites, the proposed technique will validate if the edge computing consumption points can get the required edge computing support throughout their respective travel paths; (vii) the proposed technique will identify the position of various LEO satellites which can provide support during the travel of the edge computing consumption points; (viii) appropriate route is recommended so that the edge computing consumption points can get continuous space edge computing support; (ix) there will be an AI system integrated here with the attributes, recommendation generated and with success and service provided information to be fed and generate a machine learning model; (x) historical information will be classified into above machine learning model and leanings can be improved using re-enforcement learning model; and (xi) the models can generate a report which can be used for satellite manufacturing, as well firmware improvements and future recommendations on satellite service provisioning.

Some embodiments of the present invention may include one, or more, of the following operations, features, characteristics and/or advantages: (i) recommending appropriate routes to the edge computing consumption points (like airplanes, ships, etc.) so that required quality of LEO satellite edge computing can be achieved; (ii) based on the required level of edge computing quality (e.g., processing data within defined time range) the space edge computing ecosystem (e.g., LEO Satellites) will predict the availability of the required number of satellites so that the one or more edge computing consumption points (like airplanes, ships, etc.) can receive the required edge computing supports; (iii) based on amount of edge computing need by one or more edge computing consumption points (like airplanes, ships, etc.) and relative geo-location of the edge computing consumption points with respect to the LEO satellites, recommending appropriate routes to the edge computing consumption points (like airplanes, ships, etc.) so that required quality of LEO satellite edge computing can be achieved, whereas quality is considered with multiple attributes; (iv) based on predicted demand of the edge computing need at the edge computing consumption points with required level of edge computing quality, the space edge computing ecosystem (LEO satellites) will ensure the required computing resources are available so that edge computing demands can be provided; (v) use historical learning about: (a) edge computing demands, (b) required level of edge computing qualities, and (c) availability of the space edge computing resources and relative movement path of the LEO satellites, etc.; (vi) recommending the appropriate mobility path or route of the edge computing consumption points to ensure the required quality level of edge computing from space based edge computing is provided throughout the journey(s) of the consumption points; (vii) based on relative positions of LEO satellites and the orbits of the LEO satellite, and historical support on edge computing with required quality, identify which orbital position needs additional satellite(s) to be placed so that the required level of quality of edge computing can be provided; and (viii) identifying the health of different satellites, performance of the satellites, and accordingly ensuring the required number of satellites are engaged to perform edge computing with required quality.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) comprising:
   receiving an edge computing satellite dataset including information indicative of (i) orbital information of a plurality of edge computing satellites devices in orbit around Earth, and (ii) edge computing capabilities of the plurality of edge computing satellite devices;
   receiving a plurality of edge computing mobile consumption point datasets corresponding to a plurality of edge computing mobile consumption points, including a first edge computing mobile consumption point, where a given edge computing mobile consumption point dataset includes (i) transit information for the given edge computing mobile consumption point, and (ii) edge computing requirements of the given edge computing mobile consumption point;
   determining, by machine logic, a predicted edge computing resources availability dataset corresponding to predicted availability of edge computing resources of the plurality of edge computing satellite devices based, at least in part, on: (i) the edge computing satellite dataset, and (ii) the plurality of edge computing mobile consumption point datasets; and
   determining, by machine logic, a transit route from a current location of the first edge computing mobile consumption point to a destination location of the first edge computing mobile consumption point based, at least in part, on (i) the transit information of the first edge computing mobile consumption point, (ii) the edge computing requirements of the first edge computing mobile consumption point, and (iii) the predicted edge computing resources availability dataset.

2. The CIM of claim 1, wherein the transit route corresponds to a transit route where the predicted edge computing resources availability dataset indicates that edge computing resources are predicted to be available at least sufficient to meet the edge computing requirements of the first edge computing mobile consumption point.

3. The CIM of claim 1, wherein the edge computing capabilities of each satellite device of the plurality of edge computing satellite devices includes both units of computer processing and units of computer memory.

4. The CIM of claim 1, wherein the edge computing mobile consumption points are selected from the group consisting of: (i) aircraft, (ii) aquatic vessels, (iii) automobiles, and (iv) spacecraft.

5. The CIM of claim 1, wherein at least some of the plurality of edge computing satellite devices orbits the Earth at a low earth orbit.

6. The CIM of claim 1, wherein the predicted edge computing resources availability dataset is determined, at least in part, by a machine learning model trained using historical edge computing satellites device usage datasets corresponding to historical usage of the plurality of edge computing satellites devices by edge computing mobile consumption points to output patterns of consumption of edge computing resources of the plurality of edge computing satellites devices by edge computing mobile consumption points.

7. A computer program product (CPP) comprising:
one or more computer-readable storage media; and
program instructions stored on the one or more computer-readable storage media to perform operations comprising:
receiving an edge computing satellite dataset including information indicative of (i) orbital information of a plurality of edge computing satellites devices in orbit around Earth, and (ii) edge computing capabilities of the plurality of edge computing satellite devices,
receiving a plurality of edge computing mobile consumption point datasets corresponding to a plurality of edge computing mobile consumption points, including a first edge computing mobile consumption point, where a given edge computing mobile consumption point dataset includes (i) transit information for the given edge computing mobile consumption point, and (ii) edge computing requirements of the given edge computing mobile consumption point,
determining, by machine logic, a predicted edge computing resources availability dataset corresponding to predicted availability of edge computing resources of the plurality of edge computing satellite devices based, at least in part, on: (i) the edge computing satellite dataset, and (ii) the plurality of edge computing mobile consumption point datasets, and
determining, by machine logic, a transit route from a current location of the first edge computing mobile consumption point to a destination location of the first edge computing mobile consumption point based, at least in part, on (i) the transit information of the first edge computing mobile consumption point, (ii) the edge computing requirements of the first edge computing mobile consumption point, and (iii) the predicted edge computing resources availability dataset.

8. The CPP of claim 7, wherein the transit route corresponds to a transit route where the predicted edge computing resources availability dataset indicates that edge computing resources are predicted to be available at least sufficient to meet the edge computing requirements of the first edge computing mobile consumption point.

9. The CPP of claim 7, wherein the edge computing capabilities of each satellite device of the plurality of edge computing satellite devices includes both units of computer processing and units of computer memory.

10. The CPP of claim 7, wherein the edge computing mobile consumption points are selected from the group consisting of: (i) aircraft, (ii) aquatic vessels, (iii) automobiles, and (iv) spacecraft.

11. The CPP of claim 7, wherein at least some of the plurality of edge computing satellite devices orbits the Earth at a low earth orbit.

12. The CPP of claim 7, wherein the predicted edge computing resources availability dataset is determined, at least in part, by a machine learning model trained using historical edge computing satellites device usage datasets corresponding to historical usage of the plurality of edge computing satellites devices by edge computing mobile consumption points to output patterns of consumption of edge computing resources of the plurality of edge computing satellites devices by edge computing mobile consumption points.

13. A computer system (CS) comprising:
a processor set;
one or more computer-readable storage media; and
program instructions stored on the one or more computer-readable storage media to cause the processor set to perform operations comprising:
receiving an edge computing satellite dataset including information indicative of (i) orbital information of a plurality of edge computing satellites devices in orbit around Earth, and (ii) edge computing capabilities of the plurality of edge computing satellite devices,
receiving a plurality of edge computing mobile consumption point datasets corresponding to a plurality of edge computing mobile consumption points, including a first edge computing mobile consumption point, where a given edge computing mobile consumption point dataset includes (i) transit information for the given edge computing mobile consumption point, and (ii) edge computing requirements of the given edge computing mobile consumption point,
determining, by machine logic, a predicted edge computing resources availability dataset corresponding to predicted availability of edge computing resources of the plurality of edge computing satellite devices based, at least in part, on: (i) the edge computing satellite dataset, and (ii) the plurality of edge computing mobile consumption point datasets, and
determining, by machine logic, a transit route from a current location of the first edge computing mobile consumption point to a destination location of the first edge computing mobile consumption point based, at least in part, on (i) the transit information of the first edge computing mobile consumption point, (ii) the edge computing requirements of the first edge computing mobile consumption point, and (iii) the predicted edge computing resources availability dataset.

14. The CS of claim 13, wherein the transit route corresponds to a transit route where the predicted edge computing resources availability dataset indicates that edge computing resources are predicted to be available at least sufficient to meet the edge computing requirements of the first edge computing mobile consumption point.

15. The CS of claim 13, wherein the edge computing capabilities of each satellite device of the plurality of edge computing satellite devices includes both units of computer processing and units of computer memory.

16. The CS of claim 13, wherein the edge computing mobile consumption points are selected from the group consisting of: (i) aircraft, (ii) aquatic vessels, (iii) automobiles, and (iv) spacecraft.

17. The CS of claim 13, wherein at least some of the plurality of edge computing satellite devices orbits the Earth at a low earth orbit.

18. The CS of claim 13, wherein the predicted edge computing resources availability dataset is determined, at least in part, by a machine learning model trained using historical edge computing satellites device usage datasets corresponding to historical usage of the plurality of edge computing satellites devices by edge computing mobile consumption points to output patterns of consumption of edge computing resources of the plurality of edge computing satellites devices by edge computing mobile consumption points.

\* \* \* \* \*